United States Patent

Sommeria

[15] 3,667,023
[45] May 30, 1972

[54] TRACER CONTROL SYSTEM
[72] Inventor: Marcel R. Sommeria, Palos Heights, Ill.
[73] Assignee: Hyper-Loop, Inc., Summit, Ill.
[22] Filed: Mar. 30, 1970
[21] Appl. No.: 23,703

[52] U.S. Cl. ............................................. 318/578, 318/636
[51] Int. Cl. ................................................. G05b 19/36
[58] Field of Search ............................... 318/575–579, 636

[56] References Cited

UNITED STATES PATENTS

| | | | |
|---|---|---|---|
| 2,410,295 | 10/1946 | Kuehni et al. | 318/578 X |
| 2,837,707 | 6/1958 | Stokes | 318/578 X |
| 3,004,166 | 10/1961 | Greene | 318/577 X |

Primary Examiner—T. E. Lynch
Attorney—Pendleton, Neuman, Williams & Anderson

[57] ABSTRACT

A tracer control system employs a plurality of sampling devices for decoding signals representing information relating to the magnitude and direction of deflection of a stylus associated with a tracer head. The signals from the sampling devices are mixed with the outputs of other sampling devices, which outputs are representative of reference signals, to produce control signals to control the drive of the stylus relative to a template.

12 Claims, 4 Drawing Figures

Patented May 30, 1972 3,667,023

2 Sheets-Sheet 2

TRACER CONTROL SYSTEM

BACKGROUND OF THE INVENTION

This invention relates to tracer apparatus and especially to a control system for such apparatus, by which a stylus mounted on a tracer head may be caused to move along the contour of a template.

In conventional control systems, the output of the tracer head comprises one or two a.c. signals having a magnitude proportional to the displacement of the stylus, and a phase corresponding to the direction of the displacement. The output may be represented by a single signal having the proper magnitude and phase (the latter indicated with reference to a standard signal), or by two signals representative of the projections of the displacement in two orthogonal directions. The signal or signals from the tracer head is clipped to a level corresponding to a predetermined desired amount of deflection, filtered, and then mixed a predetermined portion of the unfiltered signal or signals to produce one or more signals indicative of the error between the desired displacement of the stylus and its actual displacement. Two error signals are provided, separated in phase by 90°, and the error signals are employed to control the machine drive in two orthogonal directions. The machine is driven in the proper direction to minimize the error between the actual and the programmed displacements.

The conventional systems all suffer from the disadvantages of being reliant on the use of filtering apparatus in their treatment of the signal or signals derived from the tracer head. The filtering apparatus limits the response of the system, and introduces a frequency-dependent phase shift, impairing the precision of maintaining the output signal in proper phase relationship. Conventional systems also require means for splitting or shifting a signal into two components in quadrature, which is also inherently frequency dependent.

SUMMARY OF THE INVENTION

The present invention has for its principal object the provision of a system to control the machine drive in two or more directions, in response to the output of a tracer head, without filtering or clipping of the signals from the tracer head, and without the need for any frequency-sensitive phase splitting or shifting networks.

Another object of the present invention is to provide a tracer control system in which the instantaneous amplitude of the signal derived from the tracer head is periodically sampled and manifested as a plurality of output signals, the output signals derived from the sampling means being fed directly to a pair of operational amplifiers adapted to control the drive of the machine in two orthogonal directions.

A further object of the present invention is to provide a tracer control system which may be tuned and aligned with only ordinary skill, and which is simple to maintain in proper operating condition.

These and other objects of the present invention will become manifest by the examination of the accompanying specification and drawings.

DESCRIPTION OF THE INVENTION

Reference will now be made to the accompanying drawings, in which.

Figure 1:
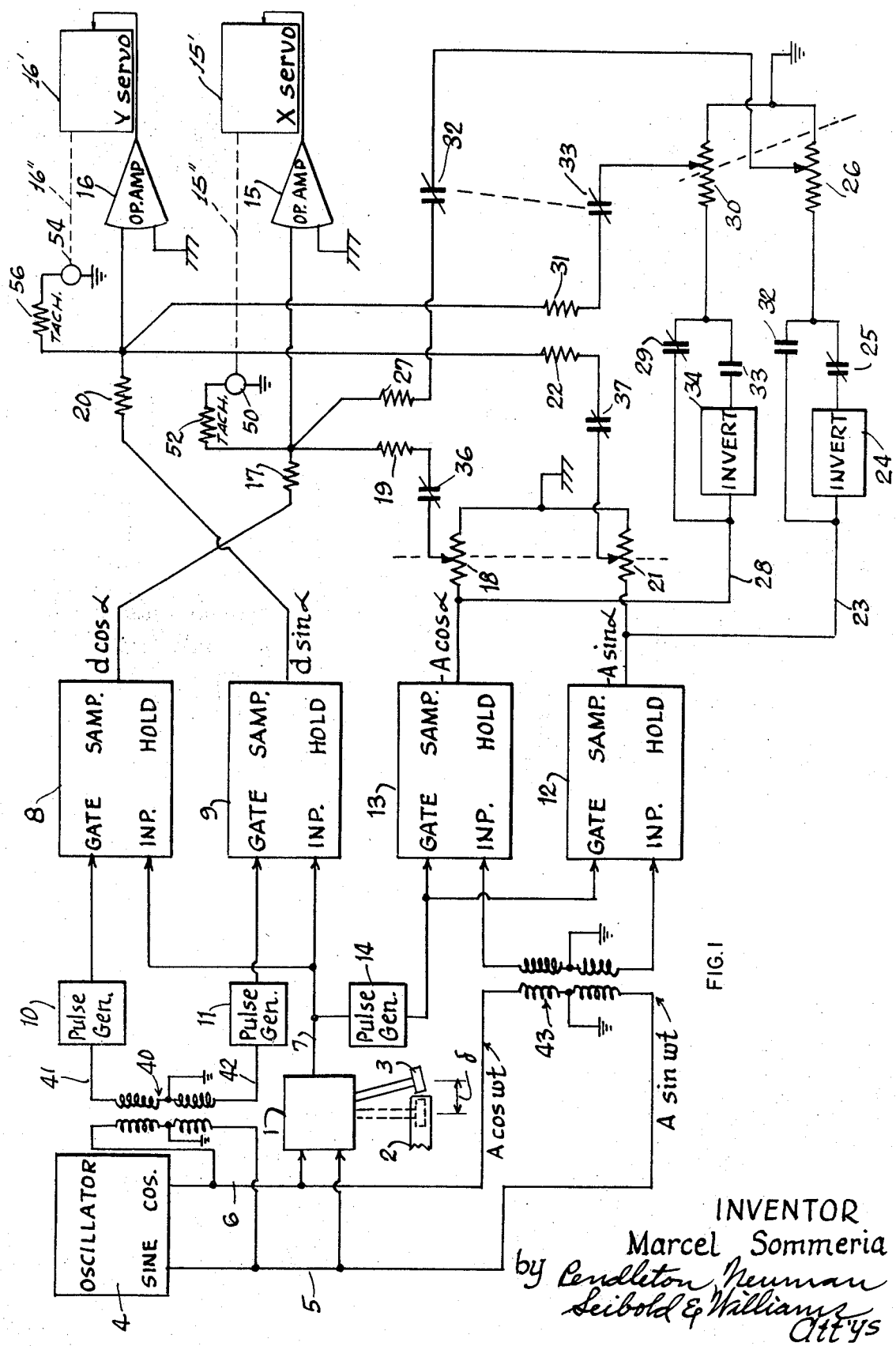
FIG. 1 is a functional block diagram of apparatus forming an exemplary embodiment of the present invention.
Figure 4E:
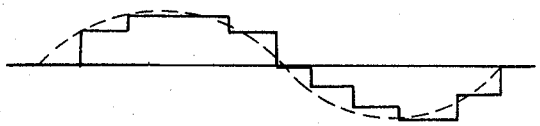
Figure 3:
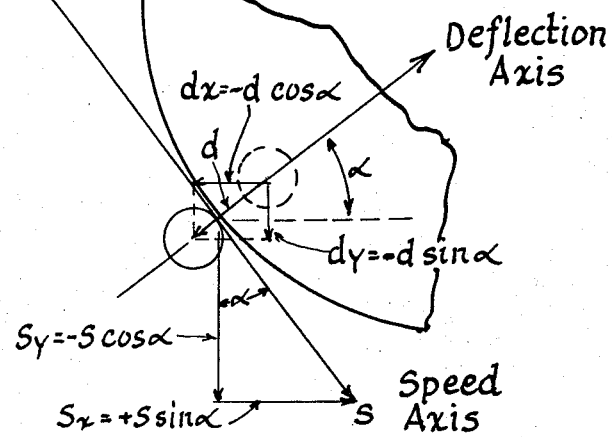
Figure 4A:
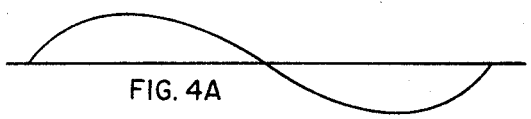
Figure 4B:
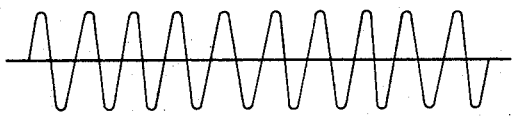
Figure 4C:
Figure 4D:
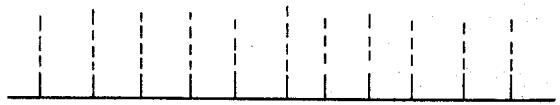

FIG. 3 is a plan view of a portion of a template, illustrating components of forces active during the operation of the apparatus of FIG. 1, when it is employed in combination with a machine having means for controlling movement between the tracer and the template in two orthogonal directions; and FIG. 4 is a diagram of several graphs illustrating the operation of the resolvers and sampling devices of the invention.

Referring now to FIG. 1, there is illustrated a tracer head 1, provided as a part of a machine having a work-supporting bed and a cutting tool mounted for movement relative to the bed. The tracer head 1 is mounted in fixed relation to the cutting tool, and a template 2 is mounted in fixed relation to the work (not shown). The tracer head 1 has a stylus 3 adapted to follow the contour of the template 2 in order to control movement of the cutting tool via the machine drive.

The tracer head is excited by the output of an oscillator 4. A sine wave is conducted from the oscillator 4 to the tracer head 1 over a line 5, and a line 6 conducts another signal to the tracer head 1. The signal on the line 6 is identical to that on line 5 except that it is in quadrature therewith. The signal on line 6 is therefore a cosine wave, while the signal on line 5 is a sine wave.

An output is produced by the tracer head 1 on a line 7. The signal on the line 7 is an a.c. signal having a frequency equal to that of the oscillator 4, an amplitude equal to the amount of deflection of the stylus 3 from its normal position, and a phase which is shifted from the phase of the signal on line 5 by an amount corresponding to the angle of deflection of the stylus 3.

The line 7 is connected to the inputs of two separate sampling devices 8 and 9. Each of the sampling devices 8 and 9 is a device, such as the Burr-Brown model No. 4013/25, which functions to sample the instantaneous magnitude of a signal applied to its input, and thereafter to manifest that magnitude. A new sampling function is performed each time the gate terminal of the device is actuated. On each actuation of the gate, a new output is manifested, corresponding to the instantaneous magnitude of the input signal at that time.

The signals applied to the gates of the sampling devices 8 and 9 are derived from the signals on the lines 5 and 6. The lines 5 and 6 are connected to the primary windings of a resolver 40. One secondary winding of the resolver 40, which produces a signal like that present on line 6 but shifted slightly in phase, is connected by a line 41 to a pulse generator 10, the output of which is connected to the gate input of the sampling device 8. The pulse generator 10 includes means for shaping the cosine wave on the line 41 into a square wave in phase with the cosine wave and then differentiating the square wave to produce a sharp pulse at the leading and trailing edges of the square wave. The pulses are sufficiently intense and long lasting to trigger the gate of the sampling device 8 and the value of the input signal is thereafter manifested until the next gate pulse.

Figure 2:
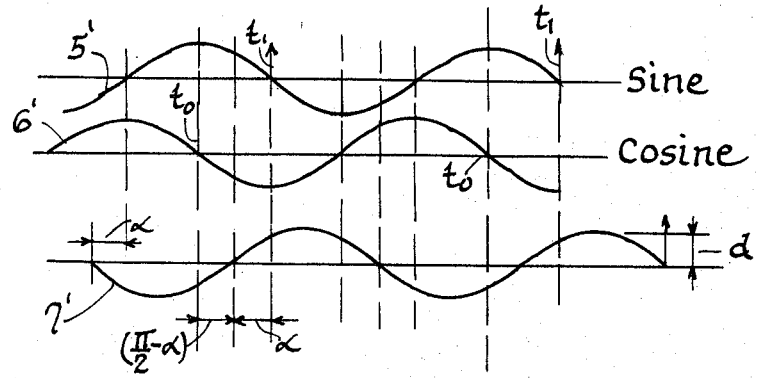
FIG. 2 is a diagram of certain waveforms which are produced during the operation of the apparatus of FIG. 1.

Referring now to FIG. 2, the sine wave signal on line 5 is shown as a waveform 5', and the cosine signal on line 6 is shown as a waveform 6'. The output of the tracer head 1 on line 7 is shown as a waveform 7', out of phase with the waveform 5' by an angle ( $\alpha + \pi$ ). The gate signal is produced by the pulse generator 10 when the waveform 6' crosses the zero axis, at time $t_0$. The magnitude of the waveform at time $t_0$ is $d \cos \alpha$, where $d$ is the amplitude of the waveform 7'.

The gate input of the sampling device 8 requires pulses of a single polarity, so that the gate is operated once during each cycle of the oscillator 4 by the pulse produced when the waveform 6' crosses the zero axis moving downward as viewed in FIG. 2. The pulses produced when the waveform 6' crosses the zero axis in the other direction are ignored.

The signal applied to the gate input of the sampling device 9 is derived from the signal on line 5. The line 5 is connected to the resolver 40, and a signal on an output line 42 corresponds with the signal on line 5, but with a slightly shifted phase, to compensate for any phase shift within the tracer head 1. The pulse generator 11 is connected between the line 42 and the gate input of the sampling device 9. The pulse generator 11 is identical to the pulse generator 10. The pulses applied to the gate terminal of the sampling device 9 are 90° out of phase with those applied to the gate terminal of the sampling device 8, and occur at time $t_1$, when the waveform 5' crosses the zero axis, as illustrated in FIG. 2. The magnitude of the waveform 7' is $d \sin \alpha$ at time $t_1$.

As a result, the outputs of the sampling devices 8 and 9 are respectively equal to $d \cos\alpha$, and $d \sin\alpha$. When the signal produced by the tracing head on line 7 is 180° out of phase with the sine wave appearing on line 5, the crossing points of the waveform 5' coincide with the crossing points of the stylus-generated waveform 7', and the output of the sampling device 9 becomes zero. If the output waveform 7' differs in phase from the sine wave on line 5 by more or less than 180°, the output of the sampling device 9 represents the sine of the difference, multiplied by the amplitude of the deflection. Since the signal on line 6 is in quadrature with that on line 5, the output from the sampling device 8 when $\alpha$ is zero is equal to the peak value of the signal generated by the tracing head 7.

In similar manner, the sine wave on line 5 is connected with the input of a sampling device 12 through a resolver 43, and the cosine wave on line 6 is applied to the input of a sampling device 13 through the same resolver. The purpose of the resolver 43 is to shift the phases of the signals on lines 5 and 6 slightly before passing them on to the sampling devices 12 and 13, to compensate for any phase shift within the tracer head 1 and the pulse generator 14. The tracer-generated signal on line 7 feeds a pulse generator 14, the output of which is applied simultaneously to the gate terminals of both sampling devices 12 and 13. Accordingly, the outputs of the sampling devices 12 and 13 are respectively $A \sin \alpha$ and $A \cos\alpha$, where A is the amplitude of the signals on lines 5 and 6. The sign of both outputs from the sampling devices 12 and 13 is negative, as indicated in FIG. 1.

These outputs correspond to the outputs generated by sampling devices 8 and 9, respectively, and differ therefrom in amplitude, since the amplitude of the outputs from the sampling devices 8 and 9 is proportional to the deflection $d$.

The four signals produced by the sampling devices 8, 9, 12 and 13 are mixed to produce a pair of output signals which are used to control the machine drives in two orthogonal directions. By this means, the cutting tool and the stylus are moved together in the appropriate direction to maintain a constant stylus deflection with a constant velocity of the stylus relative to the template.

The mixing apparatus is illustrated in FIG. 1. A pair of operational amplifiers 15 and 16 have their outputs connected to the X and Y servos 15' and 16', respectively, of the machine drive. The drive is indicated diagramatically in FIG. 1 as 15" and 16". A resistor 17 connects the signal from the sampling device 8 to the input of the operational amplifier 15. A potentiometer 18 is connected across the output of the sampling device 13, and the tap of the potentiometer 18 is connected to the input of the operational amplifier 15, by way of a resistor 19. When the signals $d \cos \alpha$ and $-A \cos \alpha$ are equal and opposite in polarity, the deflection $d$ equals the amplitude A of the oscillator 4 and the input of the operational amplifier 15 remains at a quiescent potential. As no signal is presented to the operational amplifier 15 there is no drive in the X-direction, as long as the stylus is not required to travel along the template in that direction, as will be explained hereinafter.

If A and $d$ are not identical, however, there is a net input to the operational amplifier 15, causing a drive along the X-axis in the direction which reduces the difference between the deflection d and the amplitude A of the oscillator 4.

The output of the sampling device 9 is connected to the input of the operational amplifier 16, by way of a resistor 20; a potentiometer 21 is connected across the output of the sampling device 12 and the tap of the potentiometer 21 is connected to the input of the operational amplifier 16 by means of a resistor 22. The operation of the operational amplifier 16 is identical to that of the operational amplifier 15, and produces a control signal for the Y-servo in the same manner in which the operational amplifier 15 derives the control signal of the X-servo. The control signal causes a drive along the Y-axis in the direction which reduces the difference between the deflection d and the amplitude A of the oscillator 4. An additional signal is mixed at the inputs of the operational amplifiers 15 and 16 to cause the stylus to travel along the template.

The resolvers 40 and 43 are both manually adjustable in the amount of phase shift they introduce in their signals, so that the tracking signals are not affected by phase shifts introduced by the tracer head 1 or other circuitry, but have correct relationship with the deflection which is indicated in FIG. 3.

The operation of the resolvers and the sampling devices are illustrated by the time base waveforms shown in FIG. 4. FIG. 4A is a graph of the sine of the deflection angle as the stylus traces around a circular pattern, completing 360°. FIG. 4B is the illustration of the sine waveform produced by the oscillator 4 on the line 5 during the tracing period, it being understood that normally the frequency of the oscillator is on the order of thousands of times higher than illustrated in relation to the time required to trace a circular template. FIG. 4C is an illustration of a waveform produced by the tracer head 1 in response to movement of the stylus. FIG. 4D is an illustration of the pulse train produced by the pulse generator 11, each pulse being produced at the beginning of a cycle of the waveform illustrated in FIG. 4B. FIG. 4E is an illustration of the step-like waveform produced by the sampling device 9. It corresponds during each interval between successive pulses of the pulse generator 11, to the instantaneous value of the waveform shown in FIG. 4C at the time of each previous pulse. The waveform in FIG. 4E is seen to closely approximate the sine of the deflection angle illustrated in FIG. 4A. As the oscillator frequency is much higher than that illustrated in FIG. 4B, the size of the steps shown in FIG. 4E are much smaller and closely approximate a sine wave.

Referring now to FIG. 3, which is a plan view of a template having a curved surface, it can be seen that the direction of deflection is normal to the template, and the direction of movement must be perpendicular to the direction of deflection. This is accomplished by controlling the machine drive along the X-axis by providing a signal proportional to the deflection in the Y-direction, and by simultaneously controlling the machine drive along the Y-axis by providing a signal proportional to the deflection in the X-direction. The sign of one of the signals is reversed. Clockwise and counterclockwise movement of the stylus around the template can be achieved by selectively reversing the sign of one of the control signals or the other.

The signal for controlling movement along the template in the X-direction is derived from the sampling device 12, and from a tachometer 50, which produces a signal in accordance with the speed of the X-drive 15". The output of the sampling device 12 is connected by line 23 through an inverter 24 and a normally closed contact 25 to one end of a potentiometer 26. The other end of the potentiometer 26 is connected to ground, and its tap is connected through a normally closed contact 32 and a resistor 27 to the input of the operational amplifier 15. The tachometer 50, which produces a signal proportional to the velocity of the cutting tool carrier relative to the work in the X-direction, is connected to the input of the operational amplifier 15 via a resistor 52. The signal for controlling movement in the Y-direction is derived from the sampling device 13 and a tachometer 54. The output of the sampling device 13 is connected, by a line 28, through a normally closed contact 29 to one end of a potentiometer 30. The tap of the potentiometer 30 is connected to the input of the operational amplifier 16 through a normally closed contact 33 and a resistor 31. The tachometer 54 is coupled to the Y-drive 16" and produces a signal proportional to the velocity of the cutting tool carrier relative to the work in the Y-direction, is connected to the input of the operational amplifier 16 via a resistor 56. The composite signals produced at the inputs of the operational amplifier 15 and 16 cause the stylus to track the template in a counterclockwise direction at a velocity determined by the settings of the potentiometers 26 and 30.

If clockwise tracking is desired, the contact 25 is opened, and a contact 32 is closed, connecting the line 23 to the potentiometer 26 directly and bypassing the inverter 24. Also, the contact 29 is opened and the contact 33 is closed, thereby connecting the line 28 to the potentiometer 30 through an inverter 34. By this means, the signs of the signals from the sampling devices 12 and 13 are both reversed from their former states.

The magnitude of the signals applied to the inputs of the operational amplifiers 15 and 16 through the resistors 27 and 31 is controllable by the potentiometers 26 and 30, which are ganged together. By manipulation of the potentiometers 26 and 30, the stylus tracking speed may be increased or decreased as desired. When the tracking speed in the X- and Y-directions equals the speed determined by the settings of the potentiometers 26 and 30, the signals from the tachometers 50 and 54, exactly cancel the signals from the potentiometers 26 and 30, and (provided that the displacement is of the proper magnitude), no inputs are applied to the operational amplifiers 15 and 16. When the tachometer signals are less than the corresponding signals from the potentiometers 26 and 30, the difference tends to increase the tracking speed, and when the tachometer signals exceed the corresponding signals from the potentiometers 26 and 30, the tracking speed is reduced. The potentiometers 18 and 21, which are also ganged together, are adjusted to define a predetermined deflection of the stylus. By adjusting the stylus deflection, the path traced by the cutting tool of the machine can be adjusted, relative to the template, to allow for cutting a pattern which differs in size from that of the template. The deflection control is especially advantageous when it is desired to take a rough cut at high drive speeds, and subsequently take a finish cut with a slower drive speed. The deflection is increased slightly for the finish cut.

The inverters 24 and 34 present outputs which are identical in magnitude with their respective input signals, but reversed in sign. Many circuits are known in the prior art which perform that function with great precision, and so the construction of the inverters will not be described in detail.

It is apparent that there is no filtering or clipping apparatus employed in the present invention. Therefore, the only limitation on the response of the system is the frequency of the oscillator 4, for no frequency sensitive circuits are used. Further, all of the signals which are mixed at the inputs of the operational amplifiers 15 and 16 are d.c. voltages (or alternating voltages of low frequency). No phase shifting devices or other frequency sensitive devices, are required.

A pair of normally closed contacts 32 and 33 are connected in series with the resistors 27 and 31, respectively, and another pair of normally closed contacts 36 and 37 are connected in series with the resistors 19 and 22. The contacts 34, 35, 36, and 37 are ganged together, and when they are opened, either manually or by a suitable relay, the stylus may be easily guided manually in any direction, merely by urging the stylus toward the direction in which it is to move. The tachometers 50 and 54 supply a degenerative feed back corresponding to the velocity of movement of the tracer head 1 relative to the work.

Alignment of the present invention is accomplished simply by adjusting the pulse generators 10, 11, and 14 to produce gating pulses coincident with the crossing of the zero axis by respective signals from which the gate pulses are derived. The alignment is accomplished by individually adjusting each pulse generator.

In one exemplary embodiment of the present invention, the following values where employed for the resistors and potentiometers illustrated in FIG. 2:

| 17 | 500 K | 24 | 270 K |
|----|-------|----|-------|
| 18 | 50 K  | 26 | 50 K  |
| 19 | 270 K | 27 | 150 K |
| 20 | 500 K | 30 | 50 K  |
| 21 | 50 K  | 31 | 150 K |

What is claimed is:

1. In apparatus of the type described, having a tracer head with a stylus adapted to bear on the surface of a template, drive means for moving said tracer head relative to said template in at least two orthogonal directions and an oscillator for exciting said tracing head, said tracer head producing an output indicative of the magnitude and direction of displacement of said stylus relative to said template; the combination comprising means for deriving a first signal proportional to the product of the deflection magnitude and the cosine of the deflection angle, means for deriving a second signal proportional to the product of the deflection magnitude and the sine of the deflection angle, means for deriving a third signal proportional to the product of the desired deflection magnitude and the cosine of the deflection angle, means for deriving a fourth signal proportional to the product of the desired deflection magnitude and the sine of the deflection angle, first mixing means for mixing said first and third signals to produce an output signal to control said drive means for moving said tracer head relative to said template in a first direction, and second mixing means for mixing said second and fourth signals to control said drive means for moving said tracer head relative to said template in a second direction, said second direction being orthogonal with said first direction.

2. Apparatus according to claim 1 wherein said means for deriving said signals each comprises means for selectively sampling the magnitude of an input signal and thereafter manifesting said magnitude.

3. Apparatus according to claim 2 including means for connecting one of said sampling means with said tracer head, whereby said input signal is a tracer head generated signal.

4. Apparatus according to claim 2 including means for connecting sampling means with said oscillator, whereby said input signal is an oscillator generated signal.

5. Apparatus according to claim 2, including means for connecting a first pair of said sampling means with said tracer head, whereby the input signals of said first pair of sampling means are each a tracer head generated signal, and means for connecting a second pair of said sampling means with said oscillator whereby the input signals of said second pair of sampling means are each an oscillator generated signal.

6. Apparatus according to claim 5 including means for connecting said first pair of sampling devices with said oscillator to cause said first pair of sampling means to each sample said tracer head generated signal at times bearing a predetermined phase relation to a signal generated by said oscillator, and means for connecting said second pair of sampling means to said tracer head to cause said second pair of sampling means to each sample said oscillator generated signal at times bearing a predetermined phase relation to said tracer head generated signal.

7. Apparatus according to claim 1 wherein said means for deriving said third and fourth signals include variable resistor means for adjusting the magnitude of the desired deflection.

8. Apparatus according to claim 1 including means for deriving a pair of signals respectively representative of the desired velocity of said tracer head relative to said template in two orthogonal directions, means for mixing one of said velocity representative signals with said first and third signals, and means for mixing the other of said velocity representative signals with said second and fourth signals.

9. Apparatus according to claim 8, wherein said means for deriving said velocity representative signals includes variable resister means for adjusting the desired velocity of the tracer head relative to the template.

10. Apparatus according to claim 8 including inverter means for inverting one of said velocity representative signals.

11. Apparatus according to claim 9 including selectively operable contact means for selectively inverting one or the other of said velocity representative signals.

12. Apparatus according to claim 1 including means for selectively disconnecting said third and fourth signals from said mixing means to permit manual control of the positioning of said tracer head relative to said template.

* * * * *